US012012903B2

(12) United States Patent
Li et al.

(10) Patent No.: US 12,012,903 B2
(45) Date of Patent: Jun. 18, 2024

(54) FUEL TEMPERATURE CONTROL SYSTEM

(71) Applicant: General Electric Company, Schenectady, NY (US)

(72) Inventors: Hejie Li, Mason, OH (US); Michael A. Benjamin, Cincinnati, OH (US); Nicholas Ryan Overman, Sharonville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/719,659

(22) Filed: Apr. 13, 2022

(65) Prior Publication Data
US 2023/0332549 A1    Oct. 19, 2023

(51) Int. Cl.
*F02C 9/28* (2006.01)
*F02C 7/224* (2006.01)

(52) U.S. Cl.
CPC ............... *F02C 9/28* (2013.01); *F02C 7/224* (2013.01); *F05D 2220/323* (2013.01); *F05D 2240/35* (2013.01); *F05D 2270/20* (2013.01); *F05D 2270/301* (2013.01); *F05D 2270/303* (2013.01)

(58) Field of Classification Search
CPC .... F02C 7/224; F02C 7/22; F02C 9/28; F05D 2220/323; F05D 2240/35; F05D 2270/20; F05D 2270/301; F05D 2270/303
See application file for complete search history.

(56) References Cited

U.S. PATENT DOCUMENTS

| 5,402,634 | A | 4/1995 | Marshall |
| 5,899,073 | A | 5/1999 | Akimaru |
| 7,059,276 | B2 | 6/2006 | Yamaoka et al. |
| 9,574,448 | B2 | 2/2017 | Snodgrass et al. |
| 9,581,088 | B2 | 2/2017 | Qin et al. |
| 10,174,948 | B2 | 1/2019 | Hill |
| 10,683,811 | B2 | 6/2020 | Hill |
| 2010/0107603 | A1* | 5/2010 | Smith ..................... F02C 7/224 |
| | | | 701/100 |
| 2011/0247315 | A1* | 10/2011 | Rhoden .................... F02C 9/40 |
| | | | 60/39.281 |
| 2012/0079831 | A1* | 4/2012 | Kirzhner ................. F02C 7/264 |
| | | | 60/776 |
| 2012/0090331 | A1* | 4/2012 | Bilton ..................... F02C 7/22 |
| | | | 60/734 |
| 2012/0167594 | A1 | 7/2012 | Poisson et al. |
| 2018/0142627 | A1* | 5/2018 | Harper ..................... F02C 9/40 |
| 2019/0153952 | A1* | 5/2019 | Niergarth ................. F02C 7/14 |

FOREIGN PATENT DOCUMENTS

WO        2013036392 A1    3/2013

* cited by examiner

*Primary Examiner* — Todd E Manahan
*Assistant Examiner* — Rodolphe Andre Chabreyrie
(74) *Attorney, Agent, or Firm* — McGarry Bair PC

(57) ABSTRACT

A fuel temperature control system and a method of controlling a fuel temperature for a turbine engine including supplying an aviation fuel to a fuel nozzle fluidly coupled to a combustion chamber. A fuel temperature sensor for determining at least one input parameter to define an inlet fuel temperature of the aviation fuel in the fuel nozzle. A controller for receiving the at least one input parameter and for calculating a calculated flow number in the fuel nozzle. The controller capable of comparing the calculated flow number and a reference flow number associated with a threshold during a steady state condition to determine if the aviation fuel is boiling inside the fuel nozzle.

20 Claims, 6 Drawing Sheets

FUEL TEMPERATURE CONTROL SYSTEM

TECHNICAL FIELD

The present subject matter relates generally to combustor for a turbine engine, the combustor having a fuel temperature control system.

BACKGROUND

An engine, such as a gas turbine engine, can include a turbine or other feature that is driven by combustion of a combustible fuel within a combustor of the engine. The engine utilizes fuel nozzles to inject the combustible fuel into the combustor. When fuel boils inside a fuel system, fuel system instability, combustion dynamics, and the propensity to flameout increase. Typically, fuel enters the combustor well below an average fuel boiling temperature to prevent fuel boiling during engine operations.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
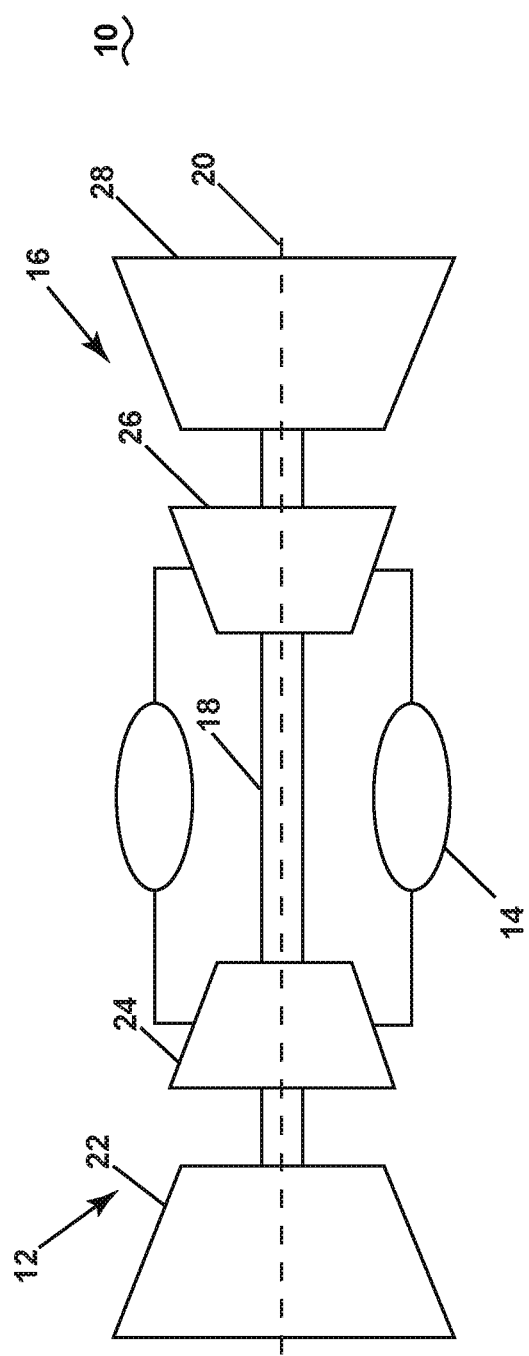
FIG. 1 is a schematic cross-sectional view of an engine in accordance with an exemplary embodiment of the present disclosure.

Aspects of the disclosure herein are directed to a fuel temperature control system with sensors in a turbine engine, more specifically with sensors close to a combustion section of the turbine engine, for controlling a fuel temperature associated with the fuel being combusted. Aviation fuels can function as a cooling media in an engine lubrication system and other engine components to reduce fuel burn. Aviation fuels range across a wide variation in boiling temperatures due to variations in fuel compositions. The fuel temperature control system described herein is adapted to determine and maximize the fuel temperature for a wide range of fuel types. For purposes of illustration, the present disclosure will be described with respect to a gas turbine engine for an aircraft with a combustor driving the turbine. It will be understood, however, that aspects of the disclosure herein are not so limited.

During operation, in order to maximize the fuel temperature received in the combustor while minimizing fuel boiling, the fuel temperature control system can include an active control on a fuel nozzle inlet to change the fuel temperature in order to minimize fuel boiling inside the fuel nozzle. The capacity to control, or change if needed, the fuel temperature enables accommodation of day-to-day fuel property variations in aircraft operations. This decreases the possibility of fuel boiling, while maximizing engine fuel burn benefit. Fuel boiling is undesirable as during engine operation this can lead to an increase in fuel system instability, combustion dynamics, and propensity to flameout (e.g., during chop from cruise to idle).

Reference will now be made in detail to the fuel temperature control system and fuel nozzle in a combustor, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, front, back, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, and connected) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about" and "generally" are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The combustor introduces fuel through a fuel nozzle, which can be mixed with air provided by a swirler, and then combusted within the combustor to drive the engine. Increases in engine heat load and overall efficiency have driven the need to use fuel that burns at higher temperatures. There is a need to maintain stability of the combustor under these operating parameters, in particular by controlling the temperature of the fuel upon introduction from the fuel nozzle.

FIG. 1 is a schematic view of an engine as an exemplary turbine engine 10. As a non-limiting example, the turbine engine 10 can be used within an aircraft. The turbine engine 10 can include, at least, a compressor section 12, a combustion section 14, and a turbine section 16. A drive shaft 18 rotationally couples the compressor section 12 and turbine section 16, such that rotation of one affects the rotation of the other, and defines an engine centerline 20 for the turbine engine 10.

The compressor section 12 can include a low-pressure (LP) compressor 22, and a high-pressure (HP) compressor 24 serially fluidly coupled to one another. The turbine section 16 can include a HP turbine 26, and a LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include an LP drive shaft (not illustrated) and an HP drive shaft (not illustrated). The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about the turbine engine 10. It will be appreciated that the representation of the compressor section 12 is merely schematic and that there can be any number of stages. Further, it is contemplated, that there can be any other number of components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section can be mounted to the casing in a circumferential manner. It is noted that there can be any number of blades, vanes and turbine stages as the illustrated turbine section is merely a schematic representation. Further, it is contemplated, that there can be any other number of components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14.

During operation of the turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section (not illustrated) downstream of the turbine section 16. The driving of the LP turbine 28 drives the LP spool to rotate the fan (not illustrated) and the LP compressor 22. The pressurized airflow and the combustion gases can together define a working airflow that flows through the fan, compressor section 12, combustion section 14, and turbine section 16 of the turbine engine 10.

Figure 2:
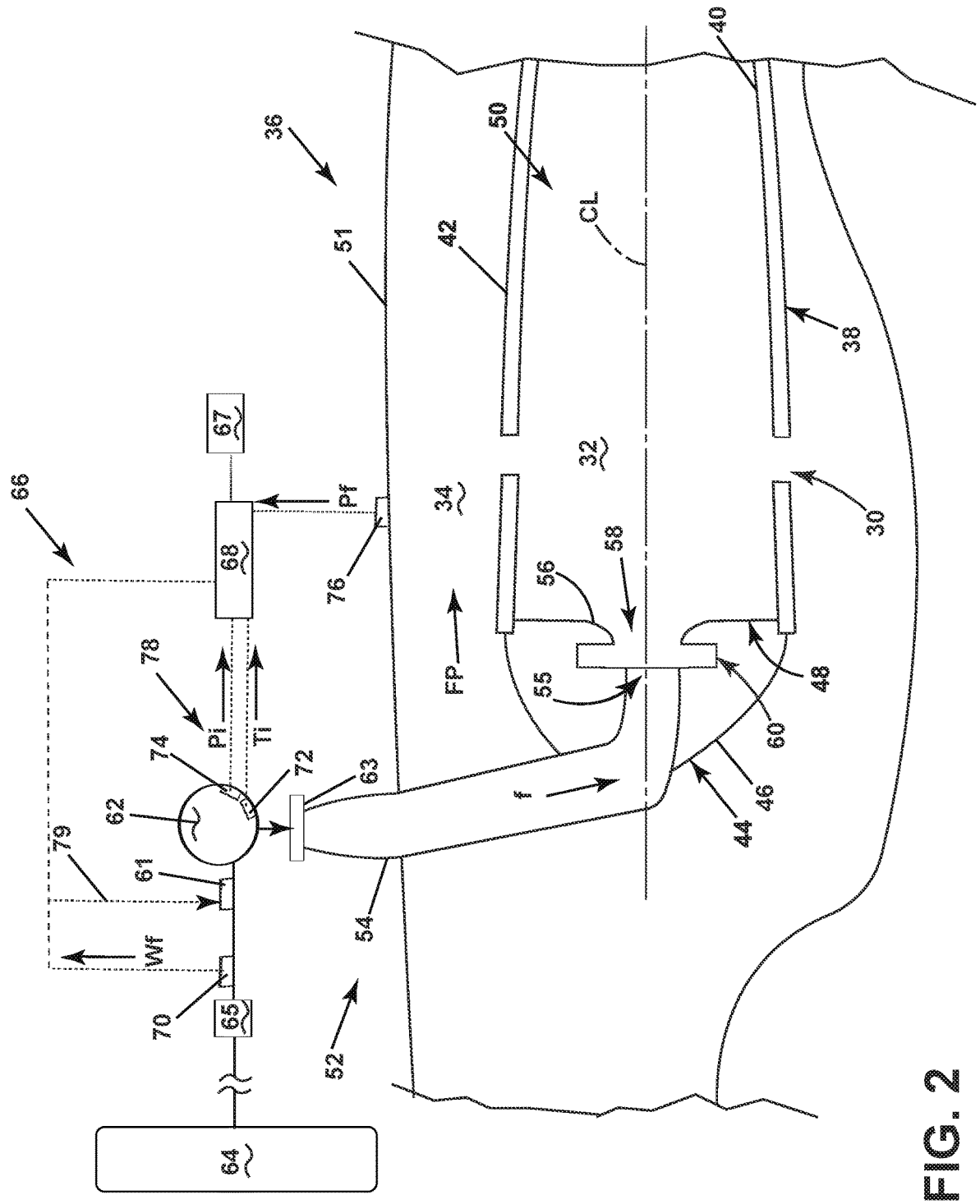
FIG. 2 is a schematic cross-sectional view of an exemplary combustor for the engine of FIG. 1 in accordance with the present disclosure.

FIG. 2 depicts a cross-section view of an exemplary combustor 36 suitable for use in the combustion section 14 of FIG. 1. The combustor 36 can have a can, can-annular, or annular arrangement depending on the type of engine in which the combustor 36 is located. The combustor 36 can include a combustor liner 38 having annular inner combustor liner 40 and an annular outer combustor liner 42. A dome assembly 44 including a dome 46 and a deflector 48 can collectively define a combustion chamber 50. The combustion chamber 50 can define a combustor centerline (CL) radially spaced from the engine centerline 20 (FIG. 1). While illustrated as extending in a general axial direction, the combustor centerline (CL) can be angled or axial as illustrated.

A first set of dilution openings or a first set of dilution holes 30 can pass through the combustor liner 38. The first set of dilution holes 30 can extend through the combustor liner 38, from the annular outer combustor liner 42 to the annular inner combustor liner 40. That is, the first set of dilutions holes 30 fluidly connects an interior 32 of the combustion chamber 50 with an exterior 34 of the combustion chamber 50. A combustor casing 51 together with the outer combustor liner 42 can define a flow path (FP) in the exterior 34 of the combustor 36.

A fuel system 52 can be fluidly coupled to the combustor 36 via at least one fuel nozzle 54 to supply fuel to the combustion chamber 50. The at least one fuel nozzle 54 can be multiple fuel nozzles 54 organized in any arrangement, including an annular arrangement about the engine centerline 20 (FIG. 1). The fuel nozzle 54 can be fluidly coupled to a fuel injector 55 disposed within the dome assembly 44 upstream of a flare cone 56 to define a fuel outlet 58. A swirler 60 can be provided at the dome assembly 44 to swirl incoming air in proximity to fuel exiting the fuel injector 55 and provide a mixture of air and fuel entering the combustor 36.

The fuel system 52 can further include a fuel manifold 62 fluidly coupled to the at least one fuel nozzle 54 at a fuel nozzle inlet 63. The fuel manifold 62 can be fluidly coupled to multiple fuel nozzles for feeding fuel (f) to each of the multiple fuel nozzles. A fuel tank 64 is located upstream from the fuel manifold 62. The fuel tank 64 can be located anywhere upstream from the fuel manifold 62, by way of non-limiting example in a body or in a set of wings of an aircraft. A heater 61 can be located downstream from the fuel tank 64 to heat the fuel (f) entering the fuel manifold 62. A fuel pump 65 can be located downstream from the fuel tank 64 and upstream from the heater 61 to control an amount of fuel (f) entering the fuel manifold 62 and in turn the at least one fuel nozzle 54.

A fuel temperature control system 66 can be located upstream of the combustor 36 and at least partially integrated with the fuel system 52. The fuel temperature control system 66 can include a controller 68 and a plurality of sensors 70, 72, 74, 76. Each sensor 70, 72, 74, 76 can be in electronic communication with the controller 68 as illustrated in dashed line. This electronic communication can be wired as all the sensors 70, 72, 74, 76 are outside the combustor casing 51. In some implementations a wireless communication between the controller 68 and sensors 70, 72, 74, 76 is contemplated. The fuel temperature control system 66 can further include a look-up table 67 with stored information related to various aviation fuel types, including, but not limited to, a fuel density ($\rho$) and reference temperatures ($T_{ref}$).

A first sensor, more specifically a fuel metering unit 70, can be part of the fuel temperature control system 66. The fuel metering unit 70 can be located downstream from the fuel pump 65, between the fuel pump 65 and the fuel manifold 62. The fuel metering unit 70 can regulate fuel flow according to required engine thrust, and provide a fuel flow rate (Wf) to controller 68.

A second sensor, more specifically a fuel temperature sensor 72, can be located in the fuel manifold 62 proximate the fuel nozzle inlet 63. "Proximate" as used herein means within a distance of each other where the fuel properties (i.e. temperature, pressure, etc.) have changed less than 5% along the distance. The fuel temperature sensor 72 can provide a fuel temperature output indicative of a temperature of the aviation fuel, and more particularly of an inlet fuel temperature ($T_i$) of the aviation fuel at the fuel nozzle inlet 63. The fuel temperature sensor 72 can be located at any suitable location in the fuel manifold 62. As another example, the fuel temperature sensor 72 can be located inside the fuel nozzle 54.

A third sensor, more specifically a fuel pressure sensor 74, can be located in the fuel manifold 62 proximate the fuel nozzle inlet 63. The fuel pressure sensor 74 can provide a fuel pressure output indicative of a pressure of the aviation fuel, and more particularly of a fuel nozzle inlet pressure ($P_i$) on the aviation fuel in the fuel manifold 62. The fuel pressure sensor 74 can be located at any suitable location in the fuel manifold 62. As another example, the fuel pressure sensor 74 can be located inside fuel nozzle 54. It is further contemplated that the fuel temperature sensor 72 and the fuel pressure sensor 74 are at the same location or housed within the same structure.

A fourth sensor, more specifically a downstream pressure sensor 76, can be located on the combustor casing 51 to measure air pressure in the flowpath FP. The downstream pressure sensor 76 can provide a downstream pressure output indicative of a pressure on the aviation fuel, and more particularly of a downstream pressure ($P_f$) on the aviation fuel in the combustor 36. It is further contemplated that the downstream pressure sensor 76 is fluidly connected to the flow path FP through a sensing tube or other suitable measuring device. Further, the downstream pressure sensor 76 can be at any location downstream from the fuel nozzle 54.

Readings from the sensors 70, 72, 74, 76 can be input into the controller 68 as input parameters 78. The input parameters 78 can include the fuel flow rate ($W_f$), the inlet fuel temperature ($T_i$), the fuel nozzle inlet pressure ($P_i$), and the downstream pressure ($P_f$) corresponding with each of the sensors 70, 72, 74, 76 respectively. The controller 68 can also be in electronic communication with the heater 61 as indicated by dashed arrow 79.

Figure 3:
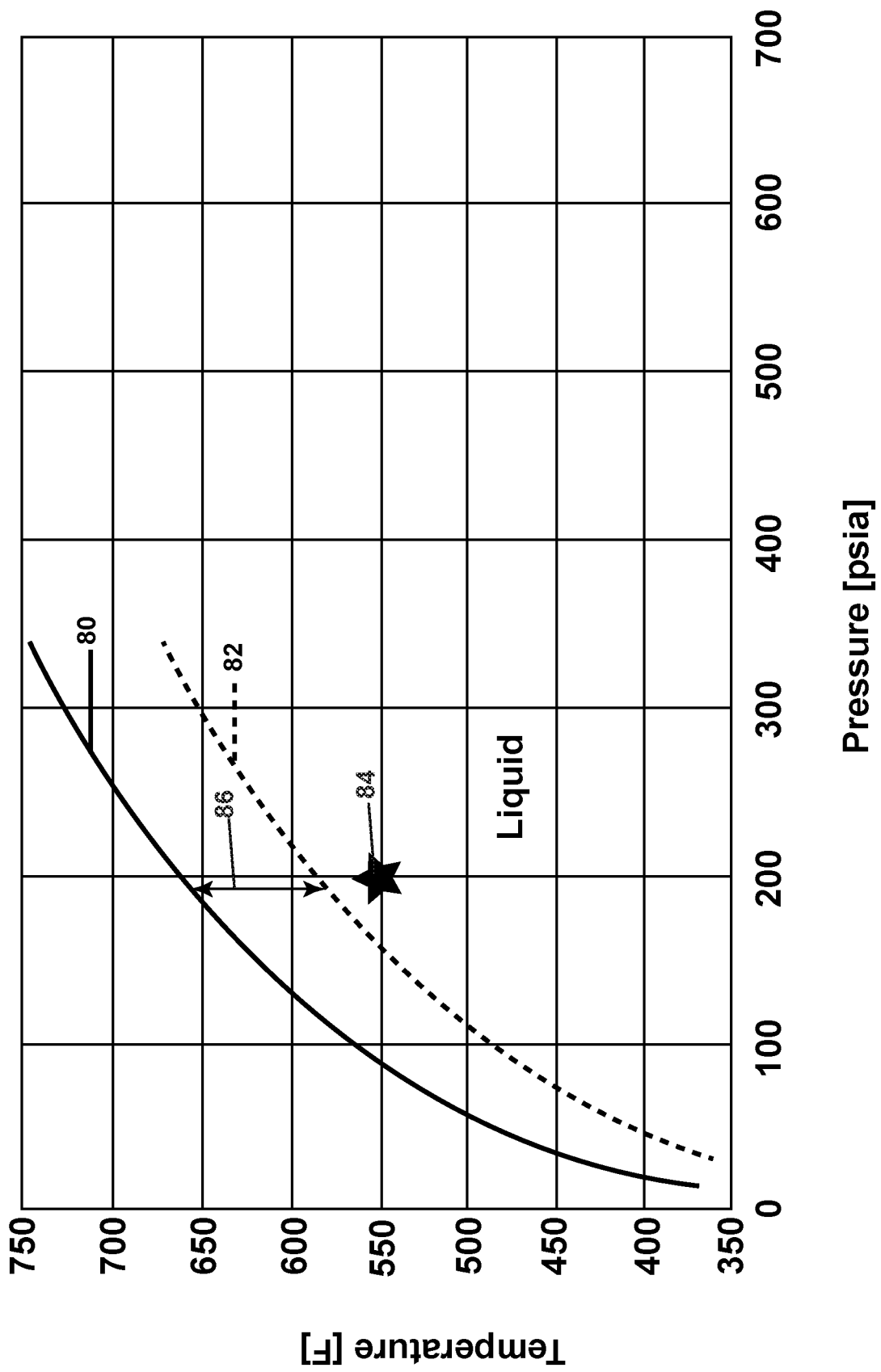
FIG. 3 is a fuel temperature margin graph.

Turning to FIG. 3, a fuel temperature margin graph is illustrated. The y-axis represents a temperature of an aviation fuel and the x-axis represents a pressure of the aviation fuel. The temperature and pressure data points can be the temperature and pressure of the aviation fuel at the inlet of fuel nozzle 54 (FIG. 2). A typical jet fuel boiling curve 80 is represented by a solid line while a minimum jet fuel boiling curve 82 is represented by a dashed line. Without an active fuel temperature control system, the temperature and pressure combinations must stay below the minimum jet fuel boiling curve 82 in order to guarantee that all aviation fuels do not boil inside fuel nozzle 54. By way of non-limiting example, during a cruise phase of operation 84, illustrated by a star at 200 psi the fuel temperature cannot exceed around 550° F., per the minimum jet fuel boiling cure 82, which accounts for fuel temperature pickup inside the fuel nozzle due to heating from surrounding air. This leaves an excessive fuel temperature margin 86. For example, if the aviation fuel actually being used in the combustor 36 was typical jet fuel represented by the typical jet fuel boiling curve 80, the combustor 36 could operate with fuel at a much higher temperature of about 650° F. enabling a more efficient engine. Utilizing the fuel temperature control system 66, temperature and pressure readings by the sensors described herein allow for higher temperature aviation fuel burning in the combustor 36.

Figure 4:
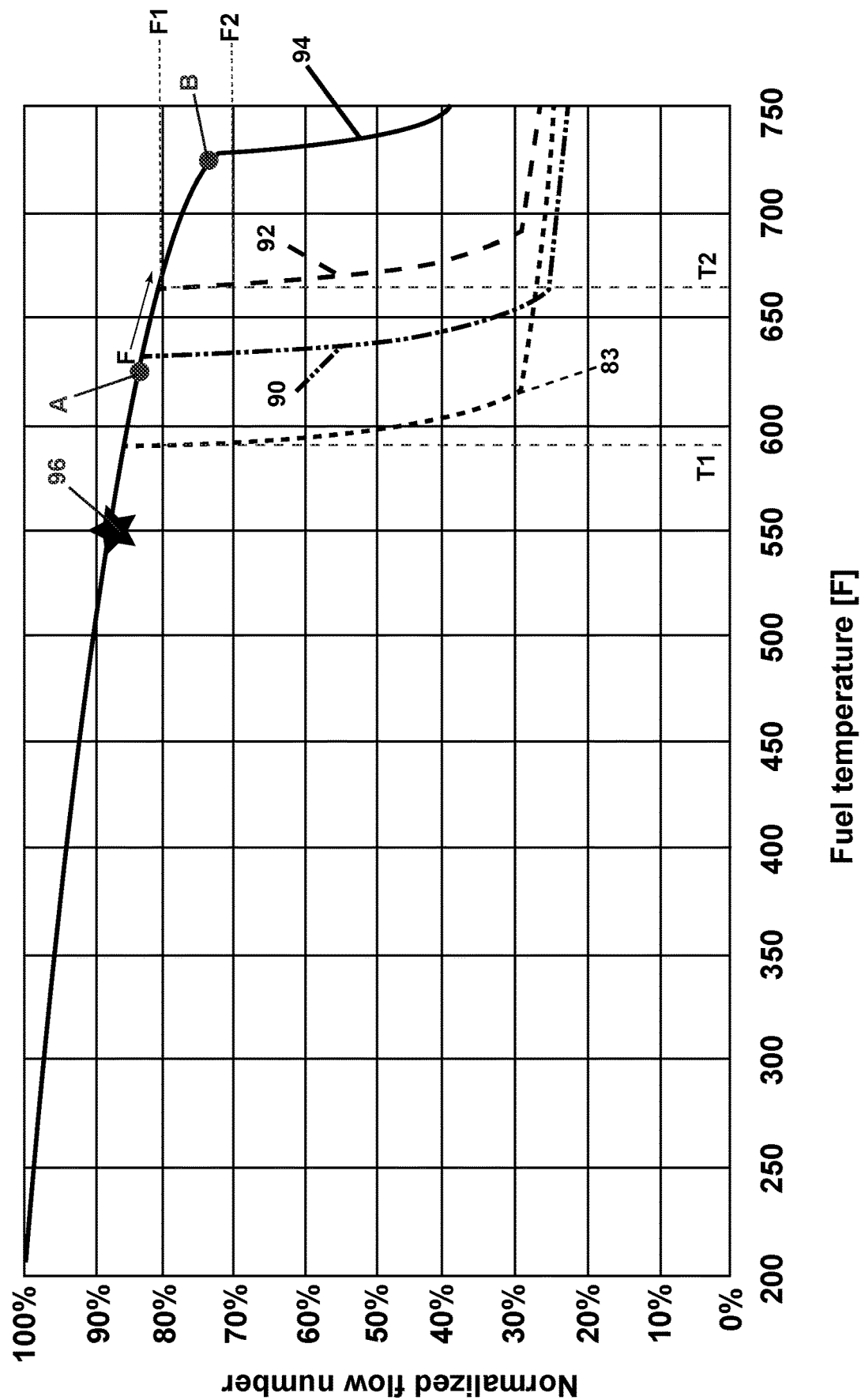
FIG. 4 is a graph illustrating various boiling curves.

FIG. 4 is a graph illustrating various boiling curves. The y-axis represents a normalized flow number for an aviation fuel and the x-axis represents the temperature of the aviation fuel. A fuel nozzle flow number (F) associated with the aviation fuel can be determined using the expression below:

$$F = \frac{W_f}{\sqrt{P_i - P_f}} \sqrt{\frac{\rho(T_i)}{\rho(T_{ref})}}$$

where ($W_f$) is the fuel flow rate, ($P_i$) is the fuel nozzle inlet pressure, ($P_f$) is the downstream pressure, ($\rho$) is the fuel density, ($T_i$) is the inlet fuel temperature, and ($T_{ref}$) is a reference temperature provided from the look-up table 67 (FIG. 2). For a given fuel type, fuel density is mainly a function of fuel temperature. A gradual decrease of the flow number from 100% at 200° F. to 90% at 500° F. is driven by a fuel density decrease. A sudden rapid drop in the fuel nozzle flow number (F) is an indication that the fuel (f) is boiling, for example at a first maximum temperature (T1), where (T1≈588° F.) on the minimum flow curve 83.

A first flow curve 90, a second flow curve 92, and a third flow curve 94, are each associated with a different fixed pressure setting in the combustor 36 (FIG. 2). Further, the minimum jet fuel boiling curve 82 (FIG. 3) as converted to a minimum flow curve 83 in the flow number vs fuel temperature graph, is also illustrated. The minimum flow curve 83 and the second flow curve 92 are representative of the same fixed pressure in the combustor 36. The minimum flow curve 83 serves as a baseline for the fuel temperature control system 66 (FIG. 2).

An inlet temperature at the fuel nozzle can be set to a starting point 96, illustrated by a star. At the starting point 96 the aviation fuel introduced into the fuel nozzle 54 (FIG. 2) is set at a minimum inlet fuel temperature ($T_{min}$), by way of non-limiting example, $T_{min}$=550° F. The starting point 96 is determined based on the minimum flow curve 83 such that the maximum fuel temperature inside the fuel nozzle 54 is below the minimum flow curve 83.

Each flow curve 90, 92, 94 represents different steady state conditions of operation. For example, the first flow curve 90 can be associated with high-altitude cruise, the second flow curve 92 with low-altitude cruise, and the third flow curve 94 with steady state climb. Other steady state conditions can include idle and takeoff, and climb or cruise in general. It should be noted that a first maximum inlet fuel temperature at point A (T≈630° F.) for cruise is less than a second maximum inlet fuel temperature at point B (T≈725° F.) during climb conditions. This difference illustrates the need to control the inlet fuel temperature based on the measured fuel pressure. The difference between minimum flow curve 83 and the second flow curve 92 illustrates a margin of operating fuel temperature differences representing potential efficiency gains in engine operation.

Therefore, it is desirable to utilize the fuel temperature control system 66 (FIG. 2) in order to optimize fuel burn by accommodating for fuel property variations and different aircraft operating conditions. The look up table 67 (FIG. 2) can include fuel density vs fuel temperature curves to determine the fuel property variations. Controlling temperature of the aviation fuel at the fuel nozzle inlet 63 (FIG. 2) also mitigates both fuel system and combustion dynamics and minimizes and/or prevents flameout from occurring.

Figure 5:
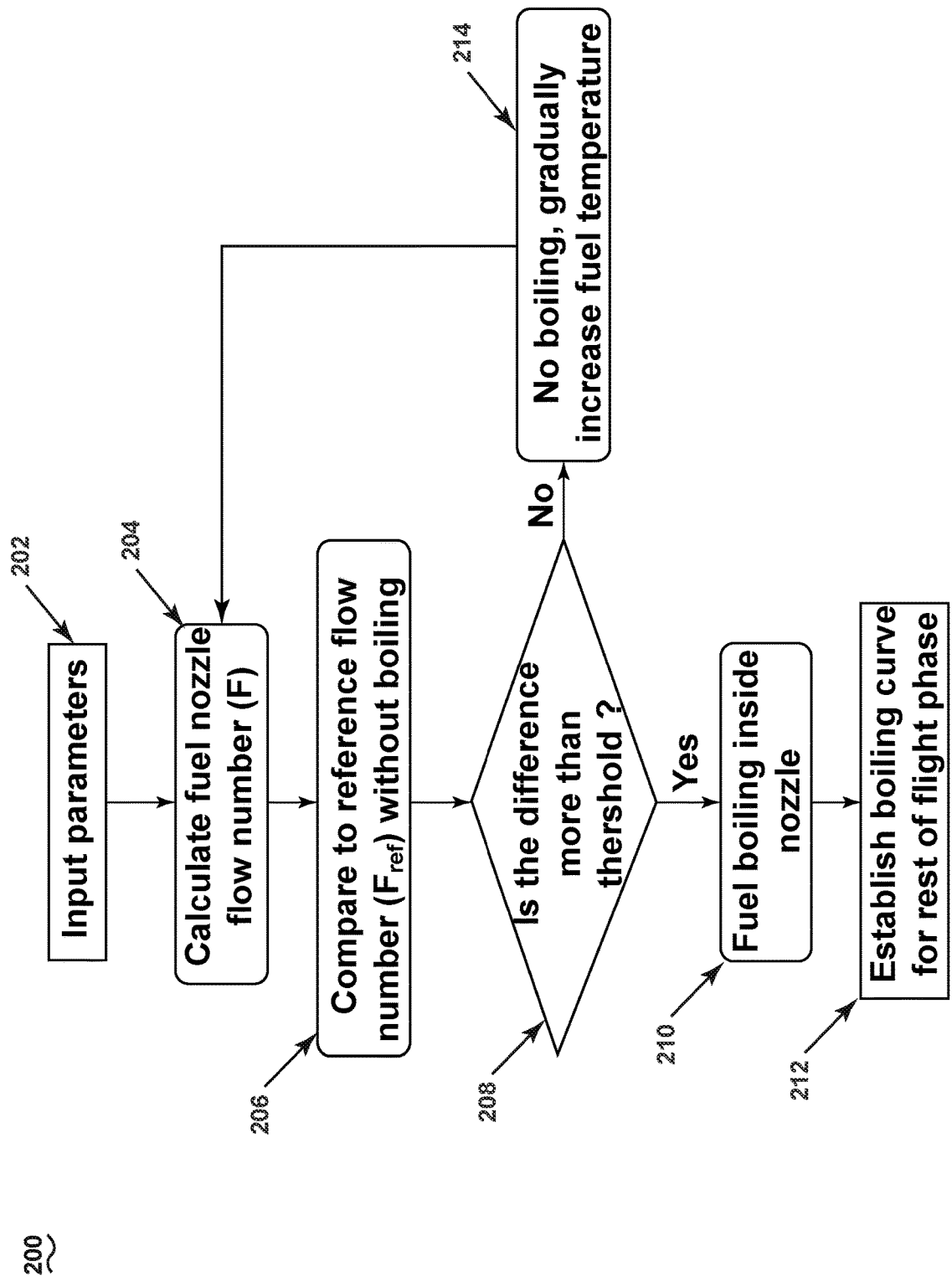
FIG. 5 is a flow chart illustrating a method for controlling a temperature of aviation fuel in the combustor of FIG. 2 according to an aspect of the disclosure herein.

Turning to FIG. 5, a flow chart illustrating a method 200 of controlling the aviation fuel temperature with the fuel temperature control system 66 (FIG. 2) is illustrated. At block 202 the input parameters 78 (FIG. 2) can be received at the controller 68 (FIG. 2). At block 204 the controller 68 calculates the fuel nozzle flow number (F) associated with the aviation fuel in use with the expression discussed herein.

At block 206 the controller 68 compares the calculated fuel nozzle flow number (F) to a reference flow number ($F_{ref}$). The third flow curve 94 from FIG. 4 could be used for determining the reference flow number ($F_{ref}$) for fuel temperature less than 725° F. At 208 a determination is made by the controller 68 to either increase the fuel temperature or to establish an in-operation boiling curve. If a difference between the calculated fuel nozzle flow number (F) and the reference flow number ($F_{ref}$) is greater than a pre-determined threshold, the aviation fuel can be determined to be boiling at 210. The pre-determined threshold can be any suitable threshold where any value above the difference calculated would guarantee that the aviation fuel is in a boiling state. In one exemplary scenario the pre-determined threshold is 5-20%. In the event the aviation fuel is determined to be boiling, at block 212 the controller 68 can establish an in-operation fuel boiling curve. The in-operation fuel boiling curve can be the minimum jet fuel boiling curve 82 or the typical jet fuel boiling curve 80 as illustrated in FIG. 3, or the in-operation fuel boiling curve can be any newly established curve above the minimum jet fuel boiling curve 82. The type of aviation fuel, fuel composition, and the sensor readings, all impact the determination of the in-operation fuel boiling curve. The method can further include maintaining a temperature of the fuel through the fuel nozzle 54 (FIG. 2) based on the in-operation boiling curve.

In the event the difference is less than the pre-determined threshold, at block 214 the aviation fuel is increased in temperature by the heater 61 (FIG. 2) and the method repeats. It should be understood that the input parameters 78 (FIG. 2) can be constantly monitored and updated whereas the inlet fuel temperature ($T_i$) is the only variable altered as part of the method.

For example, referring back to FIG. 4, at the beginning of a flight phase, the temperature of an exemplary aviation fuel is gradually increased per the method 200 above. The aviation fuel temperature can be increased from 550° F. along the third flow curve 94, during a steady state condition. Consequently, the calculated fuel nozzle flow number (F) gradually decreases. Upon reaching a low altitude cruise condition with typical jet fuel, the fuel nozzle flow number (F) drops following the second flow curve 92 from (F1) to (F2). This leaves a total difference in normalized flow numbers of about 10%. Depending on the type of fuel a threshold of between 5% and 20% can indicate that the fuel is boiling inside the fuel nozzle. For this example, with more than a 5% flow number difference at a second maximum temperature (T2) of around 668° F., the exemplary aviation fuel inside the fuel nozzle would be boiling. In this exemplary scenario, the temperature difference (T2−T1) between the first maximum temperature (T1≈588° F.) along the minimum flow curve 83 and the second maximum temperature (T2≈668° F.) along the second flow curve 92 can be used to establish the in-operation fuel boiling curve, and used for the rest of this particular flight phase. It should be understood that the rest of a particular flight phase can be for a remainder of the flight.

The ability to control the fuel temperature at the fuel nozzle inlet 63 (FIG. 2) is beneficial for engine efficiency, minimizing flame-out, and fuel system and combustion dynamics. The fuel temperature control system 66 (FIG. 2) described herein provides an ability to account for various fuel types with varying boiling temperatures during airline operations.

Figure 6:
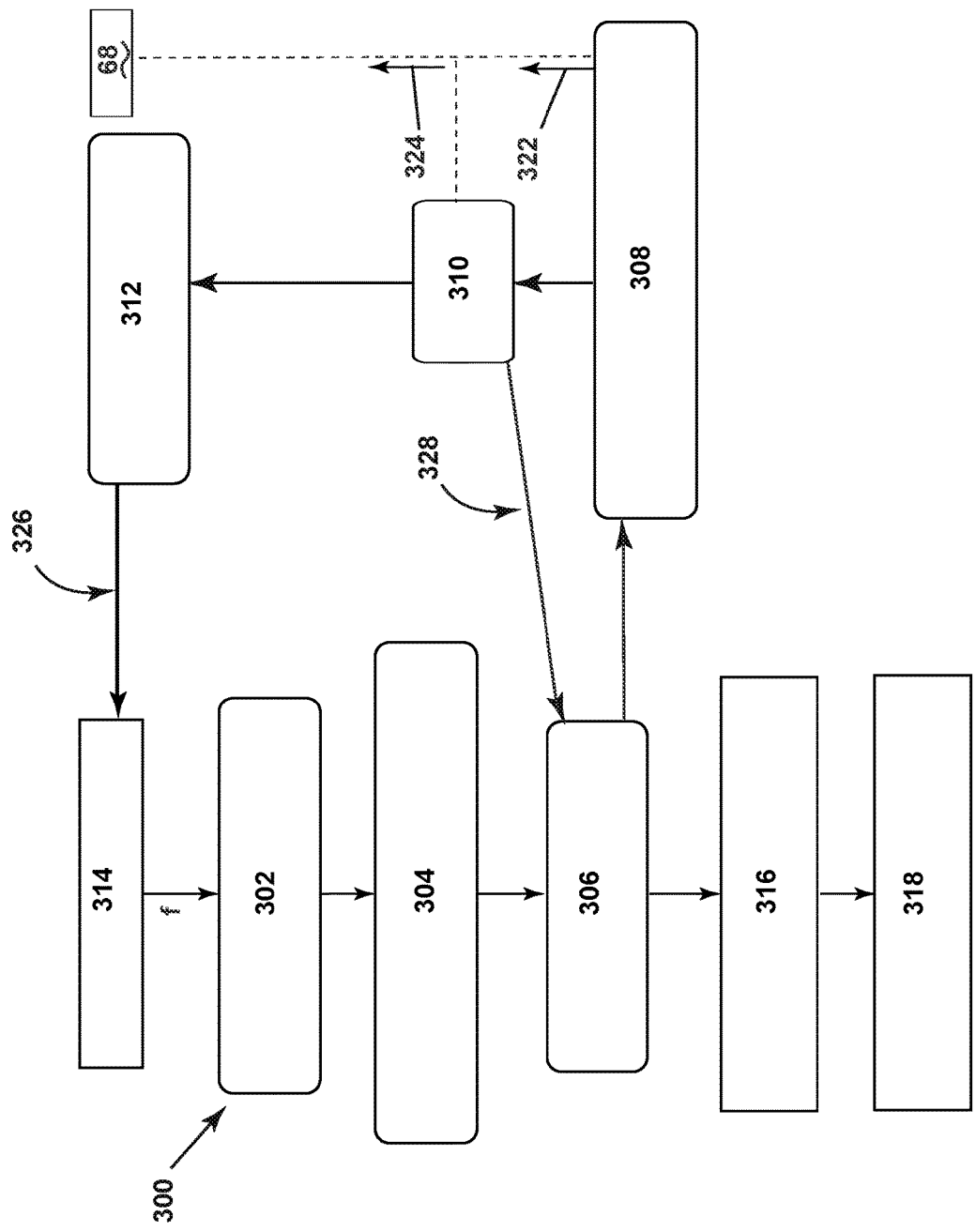
FIG. 6 is a flow chart illustrating a fuel temperature control system according to another aspect of the disclosure herein.

Turning to FIG. 6, a flow chart including a fuel temperature control system 300 according to another aspect herein is illustrated. The fuel temperature control system 300 can include a fuel pump 302, a fuel metering unit 304, a heater 306, an additional fuel metering unit 308, an orifice 310, and a cooler 312. The fuel temperature control system 300 can control a fuel flow between a fuel tank 314 and a fuel manifold 316. The fuel manifold 316 can be fluidly coupled to a fuel nozzle 318. The fuel temperature control system 300 can be located at any appropriate place within a fuel system, such as the fuel system 52 (FIG. 2) described herein. Unlike the fuel temperature control system 66 (FIG. 2) previously described, the fuel temperature control system 300 can include the fuel additional fuel metering unit 308, the heater 306, and the fuel metering unit 304 at any location upstream from the fuel manifold 316 rather than integral with the previously described fuel nozzle 54 (FIG. 0.2).

Fuel (f) can be heated at the heater 306 and then can pass through the additional fuel metering unit 308. Input parameters 322 including a fuel flow rate ($W_f$), an inlet fuel temperature ($T_i$), and a fuel pressure ($P_i$) can be taken by the additional fuel metering unit 308. The orifice 310 can be sized to impart on the fuel (f) an additional input parameter 324 of a downstream pressure ($P_f$). In other words the orifice 310 is sized to provide a measurable pressure drop to determine the fuel nozzle flow number (F). The controller 68 (FIG. 2) as described herein can receive the input parameters 322 and calculate the calculated fuel nozzle flow number (F) associated with the fuel (f). Utilizing the method 200 (FIG. 5) described herein, if a difference between the calculated fuel nozzle flow number (F) and the reference flow number ($F_{ref}$) is greater than a pre-determined threshold, the fuel (f) can be determined to be boiling.

With the fuel temperature control system 300, this determination can be made prior to fuel (f) entering the fuel manifold 316 and in turn the fuel nozzle 318. In an event 326 where the fuel (f) is determined to be boiling, the cooler 312 can be utilized to cool the fuel (f) prior to the fuel (f) being passed back to the fuel tank 314. In an event 328 where the difference is less than the pre-determined threshold, the fuel (f) can be increased in temperature by the heater 306 and the method repeats.

It should be understood that the fuel temperature control system 66 (FIG. 2) and the fuel temperature control system 300 (FIG. 6) can be one in the same, or parts of each can be combined or substituted as needed. In this way, it should be appreciated that the examples used herein are not limited specifically as shown, and a person having skill in the art should appreciate that aspects from one or more of the examples can be intermixed and/or combined with one or more aspect from other examples to define examples that can differ from the examples as shown.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

A method of controlling a fuel temperature for a turbine engine, the method comprising supplying an aviation fuel to a fuel nozzle fluidly coupled to a combustion chamber; determining at least one input parameter with a fuel temperature sensor to define an inlet fuel temperature of the aviation fuel in the fuel nozzle; receiving at a controller the at least one input parameter; calculating a calculated fuel nozzle flow number in the fuel nozzle with the controller; comparing the calculated flow number and a reference flow number associated with a threshold during a steady state condition to determine if the aviation fuel is boiling inside the fuel nozzle; determining a maximum temperature with the calculated flow number; establishing an in-operation boiling curve for a remainder of a flight phase; and maintaining a temperature of the fuel through the fuel nozzle based on the in-operation boiling curve.

The method of any preceding clause wherein determining at least one input parameter further comprises determining a fuel flow rate with a fuel metering unit located upstream of the fuel nozzle.

The method of any preceding clause wherein determining at least one input parameter further comprises determining a fuel nozzle inlet pressure with a fuel pressure sensor located upstream of the fuel nozzle.

The method of any preceding clause wherein determining at least one input parameter further comprises determining a downstream pressure with a downstream pressure sensor located proximate the combustion chamber.

The method of any preceding clause wherein determining at least one input parameter further comprises retrieving at least one of a fuel density or a reference temperature from a look-up table.

The method of any preceding clause further comprising increasing the inlet fuel temperature to a second temperature after comparing the calculated flow number to the reference flow number.

The method of any preceding clause wherein the threshold is between 5%-20%.

The method of any preceding clause wherein the threshold is 10%.

The method of any preceding clause wherein the steady state condition includes low-altitude cruise, high-altitude cruise, or steady state climb.

A method of controlling a fuel temperature during operation of a turbine engine, the method comprising flowing a fuel through a heater to heat the fuel; determining at least one input parameter of the fuel with a fuel metering unit; calculating a calculated flow number associated with the fuel; comparing the calculated flow number with a reference flow number associated with a threshold during a steady state condition to determine if the fuel is boiling; determining a boiling temperature for the fuel; generating an in-operation fuel boiling curve for the fuel based on the boiling temperature; and controlling a temperature of the fuel based on the in-operation fuel boiling curve.

The method of any preceding clause wherein determining at least one input parameter includes measuring a temperature of the fuel.

The method of any preceding clause wherein determining at least one input parameter includes measuring a fuel flow rate of the fuel.

The method of any preceding clause wherein determining at least one input parameter includes passing the fuel through an orifice sized to provide a measurable pressure drop.

The method of any preceding clause further comprising flowing the fuel downstream of the orifice through a cooler and back to the fuel tank.

The method of any preceding clause further comprising flowing the fuel downstream of the orifice through a fuel injector into a combustor of the turbine engine.

The method of any preceding clause wherein the steady state condition includes idle, takeoff, climb, or cruise.

The method of any preceding clause wherein the threshold is less than 20%.

A gas turbine engine for an aircraft comprising a compressor section and a combustion section in serial flow arrangement along an engine centerline, the combustion section comprising: a combustion chamber, a fuel nozzle fluidly coupled to the combustion chamber for providing an aviation fuel to the combustion chamber, a fuel temperature control system operably coupled to the fuel nozzle, the fuel temperature control system comprising: a heater, a fuel temperature sensor providing a fuel temperature output indicative of a temperature of the aviation fuel, a first pressure sensor providing a fuel pressure output indicative of a pressure of the aviation fuel, a second pressure sensor providing a downstream pressure output indicative of a downstream pressure in the combustion chamber, and a controller for receiving the fuel temperature output, fuel pressure output, and downstream pressure output as inputs to generate an in-operation fuel boiling curve, wherein the controller controls the heater according to the generated in-operation fuel boiling curve.

The gas turbine engine of any preceding clause wherein the fuel temperature control system is integral with the fuel nozzle.

The gas turbine engine of any preceding clause wherein the fuel temperature control system is located upstream from the fuel nozzle.

What is claimed is:

1. A gas turbine engine for an aircraft comprising:
a compressor section and a combustion section in serial flow arrangement along an engine centerline, the combustion section comprising:
a combustion chamber,
a fuel nozzle fluidly coupled to the combustion chamber for providing an aviation fuel to the combustion chamber,
a fuel temperature control system operably coupled to the fuel nozzle, the fuel temperature control system comprising:
a heater located upstream of the fuel nozzle,
a fuel temperature sensor located downstream of the heater for providing a fuel temperature output indicative of a temperature of the aviation fuel entering the fuel nozzle,
a first pressure sensor located downstream of the heater for providing a fuel pressure output indicative of a pressure of the aviation fuel entering the fuel nozzle,
a second pressure sensor located downstream of the fuel nozzle for providing a downstream pressure output indicative of a downstream pressure in the combustion chamber, and
a controller for receiving the fuel temperature output, fuel pressure output, and downstream pressure output as inputs to generate an in-operation fuel boiling curve, wherein the controller controls the heater according to the generated in-operation fuel boiling curve in order to maximize the temperature of the aviation fuel while minimizing fuel boiling.

2. The gas turbine engine of claim 1 wherein the fuel temperature control system is integral with the fuel nozzle.

3. The gas turbine engine of claim 1 wherein the fuel temperature control system is located upstream from the fuel nozzle.

4. A method of controlling a fuel temperature for the gas turbine engine of claim 1, the method comprising:
supplying the aviation fuel to the fuel nozzle fluidly coupled to the combustion chamber;
determining at least one input parameter with the fuel temperature sensor to define an inlet fuel temperature of the aviation fuel in the fuel nozzle;
receiving at the controller the at least one input parameter;
calculating a calculated fuel nozzle flow number in the fuel nozzle with the controller;
comparing the calculated fuel nozzle flow number and a reference flow number associated with a threshold during a steady state condition to determine if the aviation fuel is boiling inside the fuel nozzle;
determining a maximum temperature with the calculated fuel nozzle flow number;
establishing an in-operation boiling curve for a remainder of a flight phase; and maintaining a temperature of the fuel through the fuel nozzle based on the in-operation boiling curve.

5. The method of claim 4 wherein determining the at least one input parameter further comprises determining a fuel flow rate with a fuel metering unit located upstream of the fuel nozzle.

6. The method of claim 5 wherein determining the at least one input parameter further comprises determining a fuel nozzle inlet pressure with a fuel pressure sensor located upstream of the fuel nozzle.

7. The method of claim 6 wherein determining the at least one input parameter further comprises determining a downstream pressure with a downstream pressure sensor located proximate the combustion chamber.

8. The method of claim 7 wherein determining the at least one input parameter further comprises retrieving at least one of a fuel density or a reference temperature from a look-up table.

9. The method of claim 4 further comprising increasing the inlet fuel temperature to a second temperature after comparing the calculated fuel nuzzle flow number to the reference flow number.

10. The method of claim 4 wherein the threshold is between 5%-20%.

11. The method of claim 10 wherein the threshold is 10%.

12. The method of claim 4 wherein the steady state condition includes low-altitude cruise, high-altitude cruise, or steady state climb.

13. A method of controlling a fuel temperature during operation of the gas turbine engine of claim 1, the method comprising:
flowing a fuel through the heater to heat the fuel;
determining at least one input parameter of the fuel with a fuel metering unit;
calculating a calculated flow number associated with the fuel;
comparing the calculated flow number with a reference flow number associated with a threshold during a steady state condition to determine if the fuel is boiling;
determining a boiling temperature for the fuel;
generating an in-operation fuel boiling curve for the fuel based on the boiling temperature; and
controlling a temperature of the fuel based on the in-operation fuel boiling curve.

14. The method of claim 13 wherein determining the at least one input parameter includes measuring a temperature of the fuel.

15. The method of claim 13 wherein determining the at least one input parameter includes measuring a fuel flow rate of the fuel.

16. The method of claim 13 wherein determining the at least one input parameter includes passing the fuel through an orifice sized to provide a measurable pressure drop.

17. The method of claim 16 further comprising flowing the fuel downstream of the orifice through a cooler and back to the fuel tank.

18. The method of claim 16 further comprising flowing the fuel downstream of the orifice through a fuel injector into a combustor of the turbine engine.

19. The method of claim 13 wherein the steady state condition includes idle, takeoff, climb, or cruise.

20. The method of claim 13 wherein the threshold is less than 20%.

* * * * *

UNITED STATES PATENT AND TRADEMARK OFFICE
CERTIFICATE OF CORRECTION

PATENT NO. : 12,012,903 B2
APPLICATION NO. : 17/719659
DATED : June 18, 2024
INVENTOR(S) : Hejie Li, Michael A. Benjamin and Nicholas Ryan Overman Page 1 of 1

It is certified that error appears in the above-identified patent and that said Letters Patent is hereby corrected as shown below:

In the Claims

Column 12, Claim 9, Line 35, "nuzzle" should be --nozzle--.

Column 13, Claim 17, Line 2-3, Delete "and back to the fuel tank".

Signed and Sealed this
Nineteenth Day of August, 2025

Coke Morgan Stewart
*Acting Director of the United States Patent and Trademark Office*